US008646017B2

(12) United States Patent
Amento et al.

(10) Patent No.: US 8,646,017 B2
(45) Date of Patent: Feb. 4, 2014

(54) METHOD AND APPARATUS FOR PROVIDING COLLABORATIVE VIEWING OF A MEDIA STREAM

(75) Inventors: Brian Amento, Morris Plains, NJ (US); Larry Stead, Upper Montclair, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 598 days.

(21) Appl. No.: 12/013,836

(22) Filed: Jan. 14, 2008

(65) Prior Publication Data

US 2009/0183220 A1 Jul. 16, 2009

(51) Int. Cl.
*H04N 7/173* (2011.01)
*H04N 7/16* (2011.01)

(52) U.S. Cl.
USPC .......................... 725/120; 725/135; 725/139

(58) Field of Classification Search
USPC .............. 725/120, 135, 139, 106, 37–61; 709/217–219
See application file for complete search history.

(56) References Cited

U.S. PATENT DOCUMENTS

| 6,134,531 | A * | 10/2000 | Trewitt et al. ............. 705/7.32 |
| 6,546,405 | B2 * | 4/2003 | Gupta et al. ................. 715/233 |
| 6,557,042 | B1 * | 4/2003 | He et al. ..................... 709/231 |
| 7,735,101 | B2 * | 6/2010 | Lanza et al. .................. 725/32 |
| 7,739,584 | B2 * | 6/2010 | Vella et al. .................. 715/203 |
| 2003/0182663 | A1 * | 9/2003 | Gudorf et al. .............. 725/110 |
| 2005/0132401 | A1 * | 6/2005 | Boccon-Gibod et al. ....... 725/34 |
| 2005/0210393 | A1 * | 9/2005 | Maeng ........................ 715/751 |
| 2005/0262542 | A1 * | 11/2005 | DeWeese et al. ............ 725/106 |
| 2006/0031114 | A1 * | 2/2006 | Zommers ..................... 705/10 |
| 2006/0087987 | A1 * | 4/2006 | Witt et al. ................... 370/260 |
| 2006/0218573 | A1 * | 9/2006 | Proebstel .................... 725/14 |
| 2008/0275769 | A1 * | 11/2008 | Shao .......................... 705/14 |
| 2009/0063995 | A1 * | 3/2009 | Baron et al. ................ 715/753 |
| 2009/0271821 | A1 * | 10/2009 | Zalewski ..................... 725/37 |
| 2009/0319885 | A1 * | 12/2009 | Amento et al. ............. 715/230 |
| 2010/0070999 | A1 * | 3/2010 | Morris et al. ................ 725/39 |
| 2010/0251295 | A1 * | 9/2010 | Amento et al. .............. 725/38 |
| 2010/0287236 | A1 * | 11/2010 | Amento et al. ............. 709/204 |
| 2011/0225603 | A1 * | 9/2011 | Amento et al. .............. 725/12 |
| 2012/0229588 | A1 | 9/2012 | Greenfield |

\* cited by examiner

*Primary Examiner* — Hunter B Lonsberry
*Assistant Examiner* — Alexander Q Huerta (57) ABSTRACT

A method and apparatus for providing collaborative viewing of a media stream are disclosed. For example, the method establishes a viewing group having a plurality of members, and provides at least one media stream that is accessible by the plurality of members of the viewing group. The method then receives one or more annotations from at least one of the plurality of members of the viewing group relating to the at least one media stream, and saves each of the one or more annotations with a temporal marker. The method then provides the one or more annotations to at least one of the plurality of members of the viewing group.

13 Claims, 5 Drawing Sheets

METHOD AND APPARATUS FOR PROVIDING COLLABORATIVE VIEWING OF A MEDIA STREAM

The present invention relates generally to communication networks and, more particularly, to a method and apparatus for providing collaborative viewing of a media stream e.g., via a network.

BACKGROUND OF THE INVENTION

Many aspects of enjoyment of a media stream are due to social interaction among viewers. For example, coworkers, friends, and family members might discuss various aspects of a show or a sports event that was aired on a previous night. However, with the increasing prevalence of digital video recorders and video-on-demand services, people are becoming less and less likely to watch media streams synchronously. Namely, each viewer may have the ability to time-shift the viewing of a media stream. Given that many viewers have complex schedules, media streams may be individually viewed in a time-shifted manner by a viewer, e.g., many days or even weeks later. As such, the social aspect of media viewing is becoming troublesome or being lost entirely, e.g., discussing the plot of a show with a coworker has not yet viewed the show may impact the viewing experience of the coworker.

SUMMARY OF THE INVENTION

In one embodiment, the present invention discloses a method and apparatus for providing collaborative viewing of a media stream. For example, the method establishes a viewing group having a plurality of members, and provides at least one media stream that is accessible by the plurality of members of the viewing group. The method then receives one or more annotations from at least one of the plurality of members of the viewing group relating to the at least one media stream, and saves each of the one or more annotations with a temporal marker. The method then provides the one or more annotations to at least one of the plurality of members of the viewing group.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for providing collaborative viewing of a media stream, e.g., via a network. Although the present invention is discussed below in the context of packet networks, e.g., Internet Protocol (IP) networks, the present invention is not so limited. Namely, the present invention can be applied for other networks, e.g., cellular networks and the like.

Figure 1:
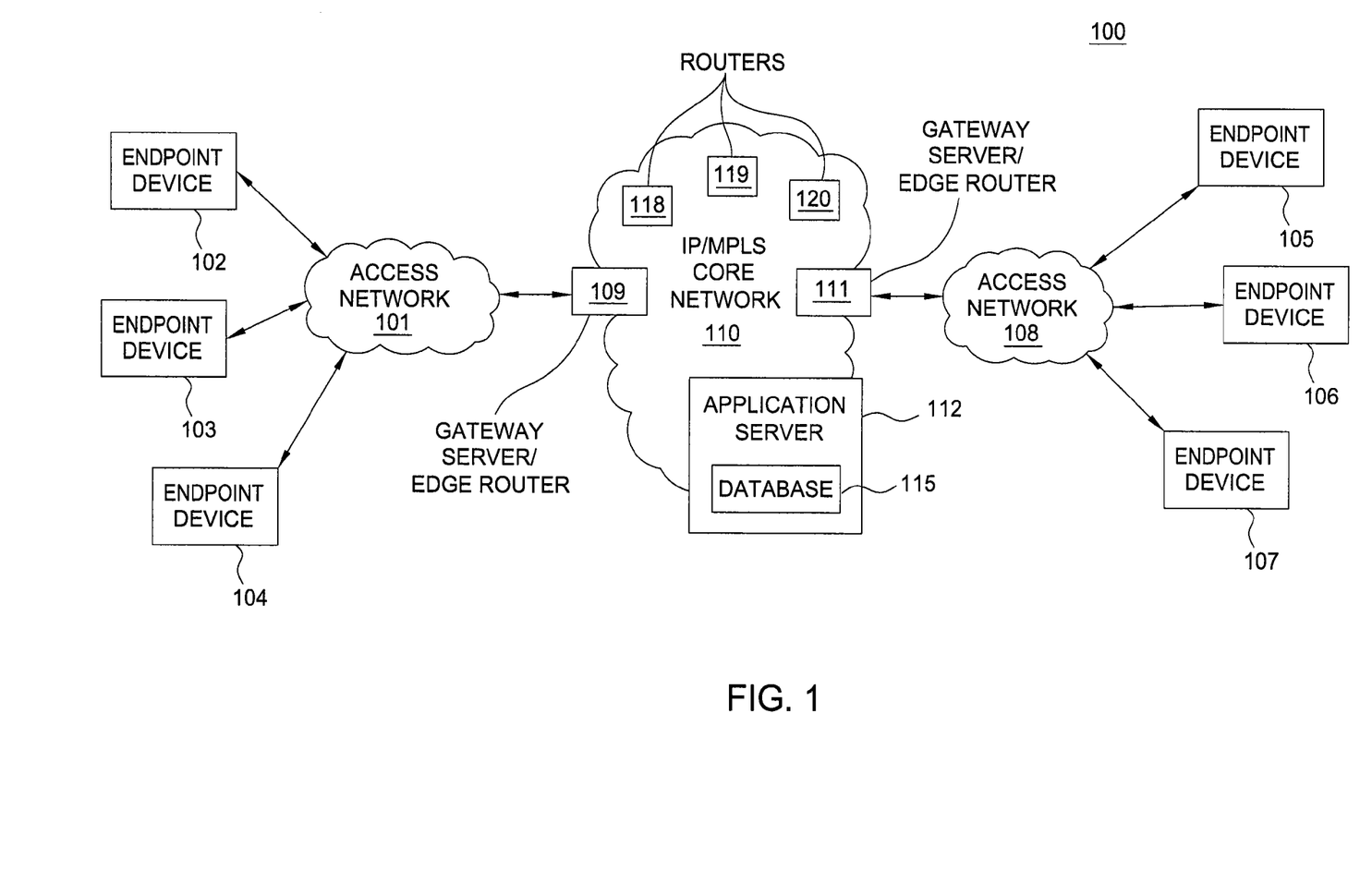
FIG. 1 illustrates an exemplary network related to the present invention.

FIG. 1 is a block diagram depicting an exemplary packet network 100 related to the current invention. Exemplary packet networks include Internet protocol (IP) networks, Asynchronous Transfer Mode (ATM) networks, frame-relay networks, and the like. An IP network is broadly defined as a network that uses Internet Protocol such as IPv4 or IPv6 and the like to exchange data packets.

In one embodiment, the packet network may comprise a plurality of endpoint devices 102-104 configured for communication with the core packet network 110 (e.g., an IP based core backbone network supported by a service provider) via an access network 101. Similarly, a plurality of endpoint devices 105-107 are configured for communication with the core packet network 110 via an access network 108. The network elements 109 and 111 may serve as gateway servers or edge routers for the network 110. The gateway servers may also be referred to as border elements.

The endpoint devices 102-107 may comprise customer endpoint devices such as personal computers, laptop computers, Personal Digital Assistants (PDAs), servers, routers, and the like. The access networks 101 and 108 serve as a means to establish a connection between the endpoint devices 102-107 and the NEs 109 and 111 of the IP/MPLS core network 110. The access networks 101 and 108 may each comprise a Digital Subscriber Line (DSL) network, a broadband cable access network, a Local Area Network (LAN), a Wireless Access Network (WAN), a $3^{rd}$ party network, and the like. The access networks 101 and 108 are connected to NEs 109 and 111 of the IP/MPLS core network 110. The packets from customer endpoint devices 102-104 (traveling towards the IP/MPLS core network 110) traverse the access network 101 to reach the border element 109. The packets from customer endpoint devices 105-107 (traveling towards the IP/MPLS core network 110) traverse the access network 108 to reach the border element 111.

Some NEs (e.g., NEs 109 and 111) reside at the edge of the core infrastructure and interface with customer endpoints over various types of access networks. An NE that resides at the edge of a core infrastructure is typically implemented as an edge router, a media gateway, a border element, a firewall, a switch, and the like. An NE may also reside within the network (e.g., NEs 118-120) and may be used as a mail server, honeypot, a router, or like device. The IP/MPLS core network 110 also comprises an application server 112 that contains a database 115. The application server 112 may comprise any server or computer that is well known in the art, and the database 115 may be any type of electronic collection of data that is also well known in the art. Those skilled in the art will realize that although only six endpoint devices, two access networks, and so on are depicted in FIG. 1, the communication system 100 may be expanded by including additional endpoint devices, access networks, border elements, etc. without altering the present invention.

The above IP network is described to provide an illustrative environment in which packets for voice and data services are transmitted on networks. For example, data streams for Voice over Internet Protocol (VoIP) service, Internet Protocol Television (IPTV) service, etc. are transmitted over packet networks such as the Internet. Media streams for services such as television broadcast are intended for enjoyment by viewers. Many aspects of enjoyment of a media stream are due to social interaction(s) among viewers. For example, family members, coworkers, friends, etc. might discuss various aspects of a show or a sports event that was aired on a previous night. However, with the increasing prevalence of Digital Video Recorders (DVRs) and video-on-demand services, people are becoming less and less likely to watch media streams synchronously during the broadcast. For example, members within the same household often watch different shows based on their interest. As such, various programs (broadly referred to as media streams) are recorded so that they can be viewed at a later time. The time-shifted viewing of the recorded programs is attractive due to the complex schedules often maintained by the different viewers. Although DVRs clearly provide viewing convenience and flexibility to the viewers, it may impact the social interactions of the viewers as discussed above.

Compounding this problem is the large volume of content catering to different demographic groups and interests. For example, the average number of channels available for viewing grew from 18.8 in 1985 to 100.4 by 2003 (Nielson, 2004). The sheer volume of content (choices) makes it less and less likely for people to watch a show at the same time. DVRs affect social interaction not only among family members but also among friends, co-workers, etc. Viewers may watch media streams out of time order and with delays of days or even weeks, e.g., one viewer may watch episode 3 (previously recorded) of a show while another viewer is watching episode 6 of the same show. The delay may complicate how groups of friends/coworkers discuss the content of a show, as it is likely that only a subset of the group may have watched the same show. The delay in watching a show may cause some members of a group to be left out of the discussions. Some members may actively avoid such conversation, fearing they might learn details that could spoil the enjoyment of yet-to-be-seen shows/episodes. Furthermore, by the time everyone in the group has seen a particular episode, various members of the group may again have viewed one or more subsequent episodes and thus may have forgotten many discussion points. As such, the ability to provide time-shifted viewing of media streams provides convenience and flexibility but potentially at the expense of reducing social interactions among members of a viewing group.

In one embodiment, the current invention provides collaborative viewing of a media stream via a network regardless of the viewing times of members of a viewing group. For example, the method first enables viewers to add asynchronous annotation(s) to a media stream, e.g., a television show, a movie, a sports event, a live event, a news program, a documentary, a concert, and the like. The present invention is not limited to any particular type of media streams. The annotation also broadly encompasses any type of annotations, e.g., text annotations (e.g., having alphanumeric characters and/or symbols), audio annotations (e.g., a recorded audio file), video annotations (e.g., recorded gestures or reactions of one or more viewers as captured by a video camera) and the like. As such, an annotation may refer to a comment (e.g., text or audio) or a gesture created by a viewer regarding a media stream. The annotation may be generated at any point while watching the media stream or after viewing the media stream. Since the annotations are recorded and stored, future viewers may view the stored annotations and may also add their own annotations. In one embodiment, the annotations are linked temporally with the media stream, e.g., the video. For example, if a first viewer added a text annotation 20 minutes after the start of the media stream, then a second viewer viewing the same media stream in the future will be presented with the stored annotation at 20 minutes after the start of the media stream. As such, it would appear to the second viewer as if the first viewer is simultaneously watching the same media stream and offering his "current" comments at this point of the media stream.

In one embodiment, the current invention may also record the interactions between multiple users who are synchronously watching a media stream. For example, a group of users or members of a viewing group may be viewing a media stream, e.g., a video presentation by a vendor, where each member may provide annotations at different time frame of the video presentation. Since the annotations are linked temporally, various points of the video presentation are now identified by various viewers as being "of interest" in the sense that annotations have been recorded at these temporal points of the video presentation. For example, a viewer may show interest in a particular segment of the video presentation by creating an annotation where a question was noted or a comment was noted. Subsequently, a member who was not able to attend the viewing of the video presentation with the other members will be able to view the presentation at a later time, but more importantly, the member will also benefit from the stored annotations of the other members who previously watched the video presentation. Thus, a viewer not only is able to access the stored annotations, but is able to see the annotations temporally in the context of viewing the video presentation. Namely, the stored annotations may then be viewed by others at the appropriate time via the temporal linkage.

In one embodiment, an interest profile may be created for each viewer. For example, a viewer may insert annotations in the context of watching a sports program, but the viewer may not insert any annotations in the context of watching a news program. Since the media stream service provider is able to store all the annotations and all the media streams associated with the stored annotations, then the service provide may correlate the stored annotations with one or more interest level parameters that are stored in an interest profile for each viewer. For example, if a viewer only adds an annotation to football games where one of the teams is the New York Giants, then the service provider may correlate that the viewer is interested in the sports of football, and is also interested in the New York Giants football team, and so on. The interest level data may be collected for each media stream that is viewed by a viewer.

In one embodiment, the interest level data from various viewers and/or multiple media streams may be merged to create a group-level interest profile. For example, a service provider may note that a substantial number of annotations were added at a particular point in a sports program. The large number of annotations may be a result of a controversial play during the sports event, e.g., a penalty was called, a spectacular catch or shot was made, a player from one of the teams was ejected, a funny commercial was presented, and the like. Similarly, a service provider may note that a substantial number of annotations were added at a particular point in a movie. For example, the large number of annotations may be a result of an interesting event occurring during the presentation of the movie, e.g., a funny situation was presented, a funny joke was made, a scene with spectacular special effect was presented, a new character was presented, an interesting commercial was presented during a pause in the movie, and the like. As such, the interest level data for a group of viewers and/or for a group of media streams may be collected and merged, thereby allowing the service provider to highlight various portions of the media streams where there is a high level of viewer interest. These identified portions of the media streams may be the starting point or the triggering point that leads to additional discussion.

In one embodiment, interest profiles may be used for generating new programmings, and skipping to the most interesting points in a media stream. For example, a service provider may notice that many annotations are related to a particular character in a TV program over a period of time. This level of interest can be used to come to a conclusion that a spin-off show can be based on this particular character. Alternatively, a service provider may notice that many annotations are concentrated at various points of a plurality of sports events, e.g., various football games that are played during a particular weekend. A new sports program, e.g., a sports program that highlights the best plays of the week can be based on the concentration of the annotations.

Furthermore, a viewer may have limited time to view the entire stored media stream, such that the viewer will use the stored annotations as indications or as a guide that the portions of the stored media stream having annotations will likely be the most interesting. As such, the viewer may simply accelerate to those portions of the stored media stream.

Figure 4:
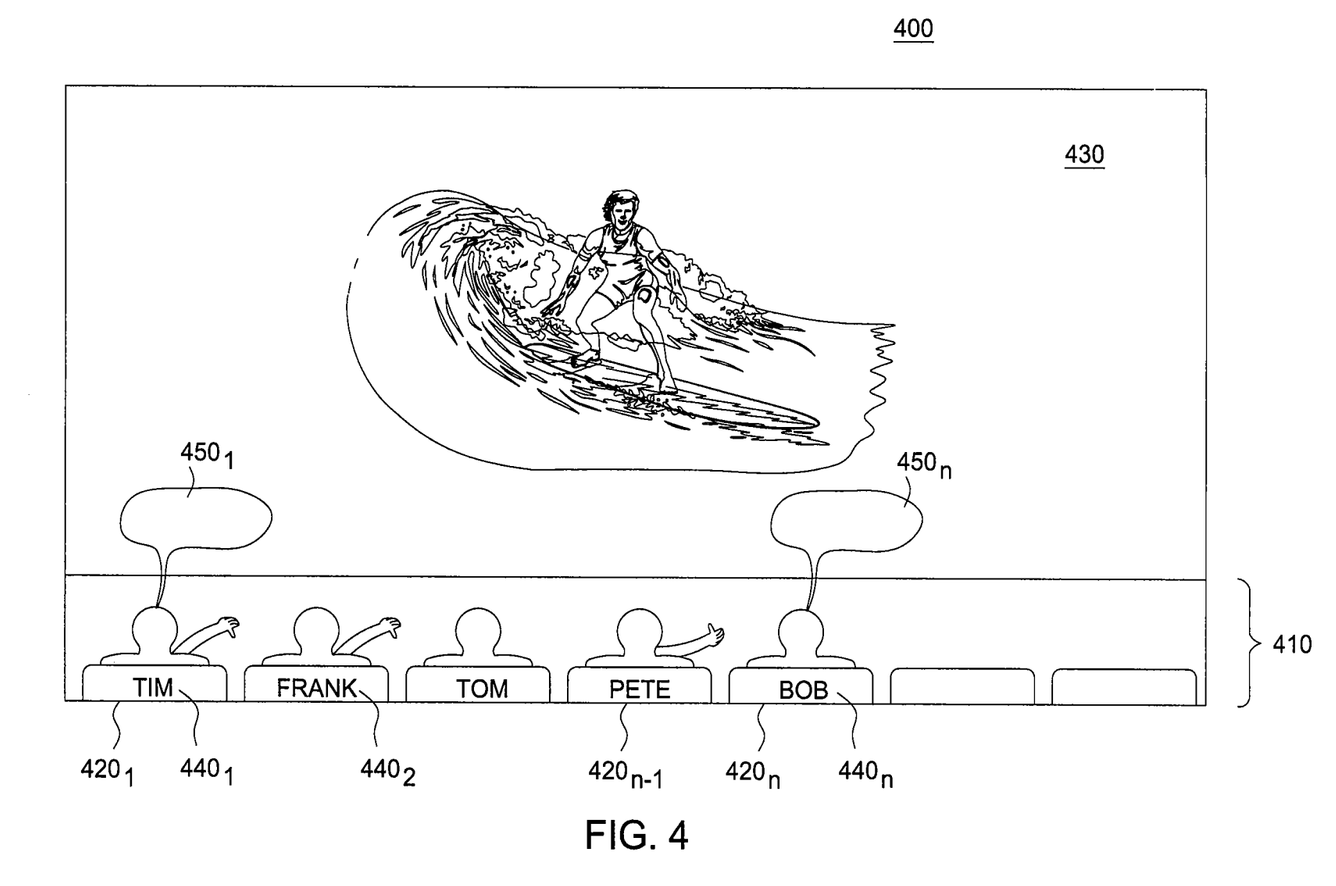
FIG. 4 illustrates a display showing a representative virtual audience.

In one embodiment, a virtual audience is created for a media stream. FIG. 4 illustrates a display 400 showing a representative virtual audience 410. For example, a virtual audience that simulates the effect of a movie theatre is created where avatars $420_{1-n}$ are presented in conjunction with the stored media stream 430. For example, the avatars $420_{1-n}$ can be presented as silhouettes against the stored media stream such that it would appear to the current viewer as watching the stored media stream behind a group of other viewers represented by their avatars $420_{1-n}$.

In one embodiment, each avatar may be named $440_{1-n}$ (e.g., corresponding to the identity of a previous viewer who has provided one or more annotations), and where each avatar may have a static location throughout the presentation of the stored media stream to assist a current viewer in associating annotations with particular individuals. In one example, annotations are shown in speech bubbles $450_{1-n}$ which appear above the avatars. In another example, avatars may raise and lower their arms to make thumbs up (e.g., see avatar $420_{n-1}$) and thumbs down gestures (e.g., see avatars $420_1$ and $420_2$) which correspond to positive (or approving) and negative (or disapproving) interest feedback, respectively. It should be noted that the manner in which the avatars is presented should not be interpreted as a limitation of the present invention.

In one embodiment, viewer actions may be animated to increase the perceived interactivity and realism, e.g. avatars may subtly shift in their seats and look around. For example, classes of annotations can be defined such that the animation of the avatars can be based on the type of annotations to be presented. For example, an "approving type" of annotations may cause the avatar to animate in a positive manner, e.g., cheering, clapping, raising a thumb, turning the head of the avatar up and down, and so on. Similarly, a "disapproving type" of annotations may cause the avatar to animate in a negative manner, e.g., frowning, pointing a thumb down, turning the head of the avatar from side to side, and so on. Similarly, a "questioning type" of annotations may cause the avatar to animate in a questioning manner, e.g., scratching the head of the avatar, placing a question mark symbol "?" over the head of the avatar, and so on.

In one embodiment, the virtual audience may accommodate both asynchronous viewers, and synchronous viewers. For example, a label such as "watching live" may be displayed below one or more avatars representing viewers who are synchronous viewers.

In one embodiment, the current invention also provides an electronic program guide that shows a view of a plurality of recorded media streams, and their associated meta-data. For example, a viewer may have previously defined one or more viewing groups of viewers, e.g., a family viewing group, a coworker viewing group, a friend viewing group, a football friend viewing group, a professional standard viewing group, and so on. It should be noted that any number of viewing groups can be defined by a viewer. In turn, a program guide may include various social elements such as the identities of members (e.g., real names, or log-in IDs only) of the various viewing groups, the media streams that have been viewed by the members of the various viewing groups, the media streams that have been viewed by the members of the various viewing groups that contain annotations from members of the various viewing groups, viewer ratings of the media streams that have been viewed the members of the various viewing groups, and so on. Presenting these social elements in the program guide will assist the viewer in selecting one of the stored media streams for viewing. For example, a viewer may have noticed from the program guide that a large number of the members in his coworker viewing group have viewed a particular stored media stream and there are numerous stored annotations as well from members of this viewing group. The viewer may then elect to view this stored media stream given that so many of his coworkers have already viewed this stored media stream.

Figure 2:
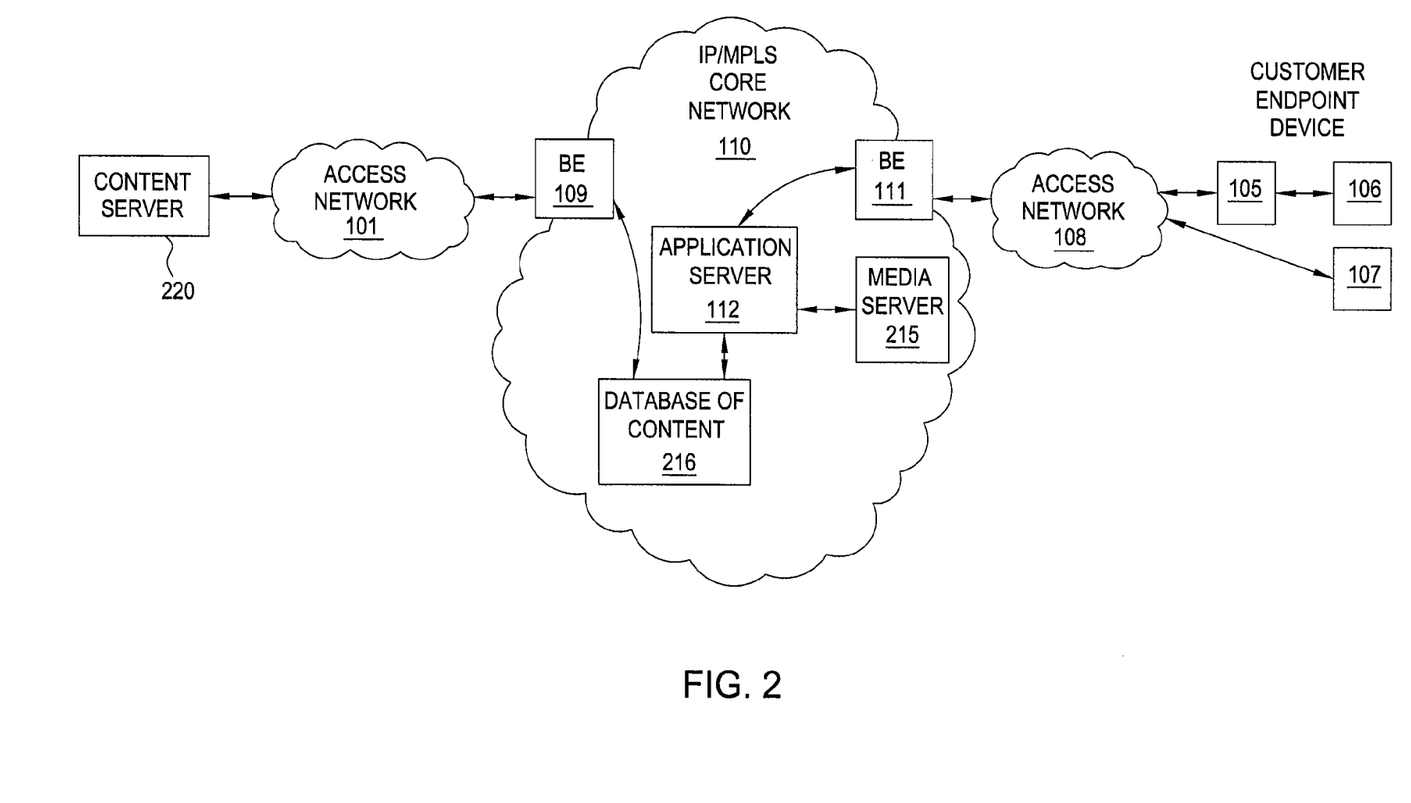
FIG. 2 illustrates an exemplary network for providing collaborative viewing of a media stream on a network.

FIG. 2 illustrates an exemplary network 200 for providing collaborative viewing of a media stream, e.g., via one or more networks. For example, a content server 220 is connected to an IP/MPLS core network 110 via an access network 101 and border element 109. The IP/MPLS core network 110 contains an application server 112, a media server 215, and a database of content 216. Customer endpoint devices 105-107 are connected to the IP/MPLS core network 110 via an access network 108 and border element 111. Customer endpoint devices 106 and 107 may be used for viewing a media stream and providing annotations. For example, customer endpoint devices 106 and 107 may comprise televisions, computers, laptops, etc. In one embodiment, customer endpoint device 105 may be used for local storage of media contents. For example, customer endpoint device 105 may be a DVR used to store media content for delayed viewing and/or annotations from other viewers.

In one embodiment, the service provider implements the current method for providing collaborative viewing of media stream in an application server 112. The customers with endpoint devices 105-107 may interact with the application server 112 for collaborative viewing of a media stream. For example, the application server 112 may store media contents (e.g., one or more media streams) received from the content server 220 in the database of content 216. It should be noted that the media content may encompass a live broadcast from the content server, e.g., a live concert or a live sports event. In turn, the application server 112 provides the stored media content to the customer endpoint devices 105-107 in a format that is compatible with each endpoint point device via a media server 215.

In one embodiment, the service provider establishes or stores a collaborative viewing group in the application server 112 and makes one or more media contents accessible to the members of the viewing group. For example, the members of the viewing group can be selectively defined by a viewer, e.g., a subscriber to the services provided by the service provider. In one embodiment, the media content may be stored at a network server and then made available to the members of the viewing group. In another embodiment, the media content may have been previously transmitted to a customer endpoint device, e.g., a DVR, and stored in the customer endpoint device. The application server 112 then receives annotations from one or more members of the collaborative viewing group and saves the annotations with temporal markers.

In one embodiment, the service provider may transmit the annotations to the customer endpoint devices of the other members of the collaborative viewing group. For example, the service provider may send updates to the DVRs belonging to the members of the collaborative viewing group.

In another embodiment, the service provider may receive a signal from a member of the collaborative viewing group indicating that the member is now viewing a particular media stream. In detecting this viewing activity, the network server will send the annotations associated with the media stream that is currently being viewed by the member. For example, the application server may monitor the media content being viewed by a member of the collaborative viewing group and then sends the annotations only at that time. For example, a customer may skip several episodes of a show and watch only the last episode. Thus, annotations associated with the skipped episodes will not needlessly be sent to the viewer. The service provider may then send only the relevant annotations to the viewer, thereby reducing the number of annotations that must be sent.

Figure 3:
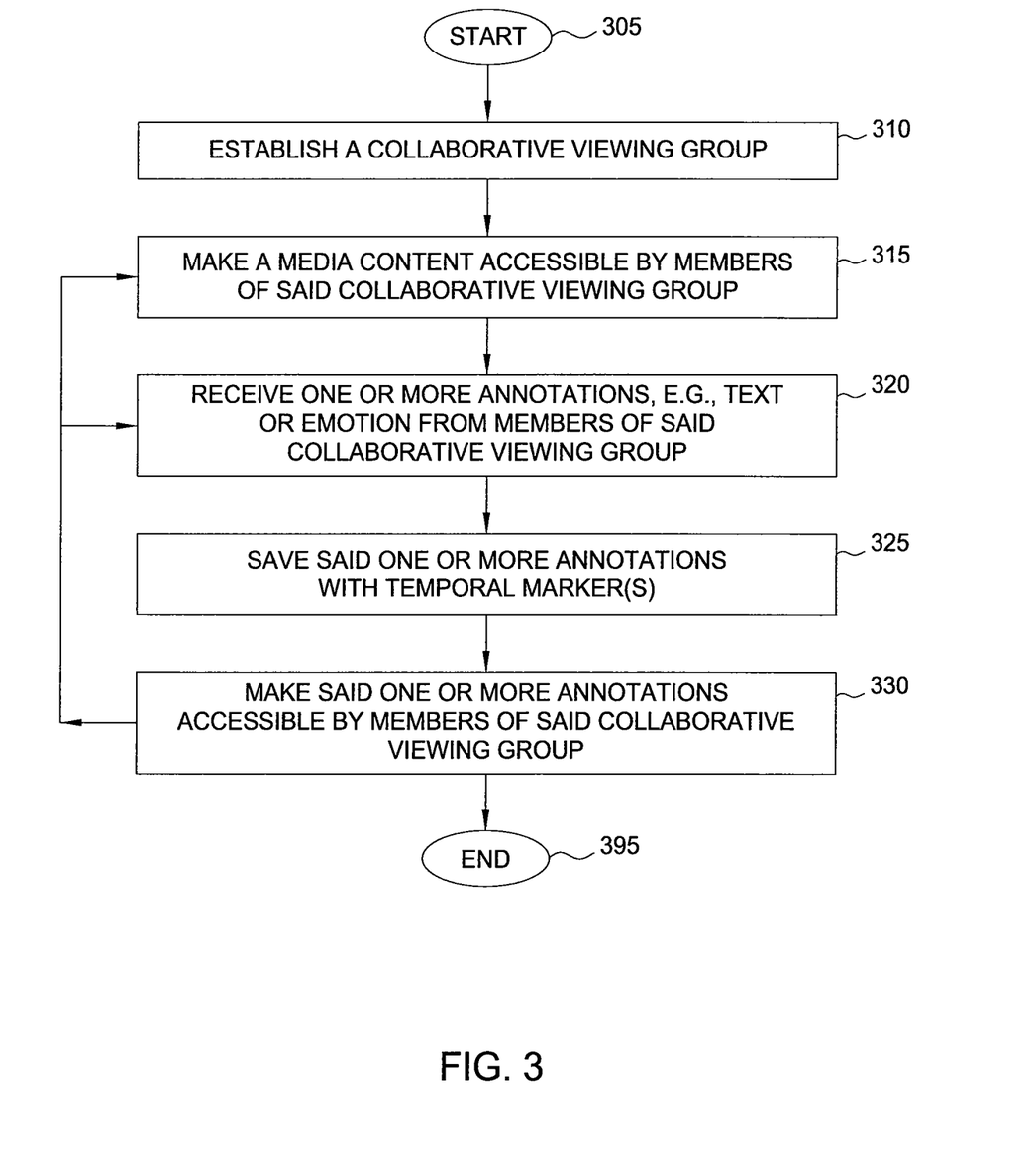
FIG. 3 illustrates a flowchart of a method for providing collaborative viewing of a media stream on a network.

FIG. 3 illustrates a flowchart of a method 300 for providing collaborative viewing of a media stream, e.g., via one or more networks. Method 300 starts in step 305 and proceeds to step 310.

In step 310, method 300 establishes a collaborative viewing group. For example, one or more customer may access an application server and join a group. In another example, a group may be established by the service provider by gathering viewer interest profiles. In yet another example, a subscriber may selectively define one or more viewing groups. The method then proceeds to step 315.

In step 315, method 300 makes a media content (broadly a media stream) accessible by members of the viewing group. In one embodiment, the media content may be stored at a network server and made available to the members of the collaborative viewing group. In another embodiment, the media content may be transmitted to a customer endpoint device such as a DVR and the media content is stored locally in the customer endpoint device.

In step 320, method 300 receives one or more annotations from one or more members of the collaborative viewing group. For example, a viewer may add a text annotation, an audio annotation, and/or a video annotation (e.g., a video camera capturing a reaction of one of the members) while viewing the media stream.

In step 325, method 300 saves the one or more annotations with temporal marker(s). For example, a viewer may have provided an annotation at a particular point in time during the presentation of the media stream, e.g., 20 minutes into a program. The method then stores the annotation and the temporal marker (e.g., 20 minutes after the beginning of program).

In step 330, method 300 makes the one or more annotations accessible by members of the collaborative viewing group. In one embodiment, the service provider may transmit the received annotations to the customer endpoint devices of other members of the collaborative viewing group. For example, the service provider may send received annotations to all the DVRs of the members of the collaborative viewing group as soon as the annotations are received and processed by the application server.

In another embodiment, the service provider may wait until it receives a signal from a member of the collaborative viewing group indicating that the member is now viewing the media stream. The service provider may then send the annotations to the member when the media stream is being viewed. For example, the application server may monitor the media stream currently being viewed by a member of the collaborative viewing group and then sends the associated annotations only at that time. For example, if a subscriber returns from a vacation and chooses not to watch old baseball games, then he/she may not be interested in seeing the annotations from other members on old games.

The method may proceed back to step 315 to continue making media content accessible to the collaborative viewing groups, and/or it may return to step 320 to continue receiving annotations. Finally, the method may also end in step 395.

It should be noted that although not specifically specified, one or more steps of method 300 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIG. 3 that recite a determining operation or involve a decision, do not necessarily require that both branches of the determining operation be practiced. In other words, one of the branches of the determining operation can be deemed as an optional step.

Figure 5:
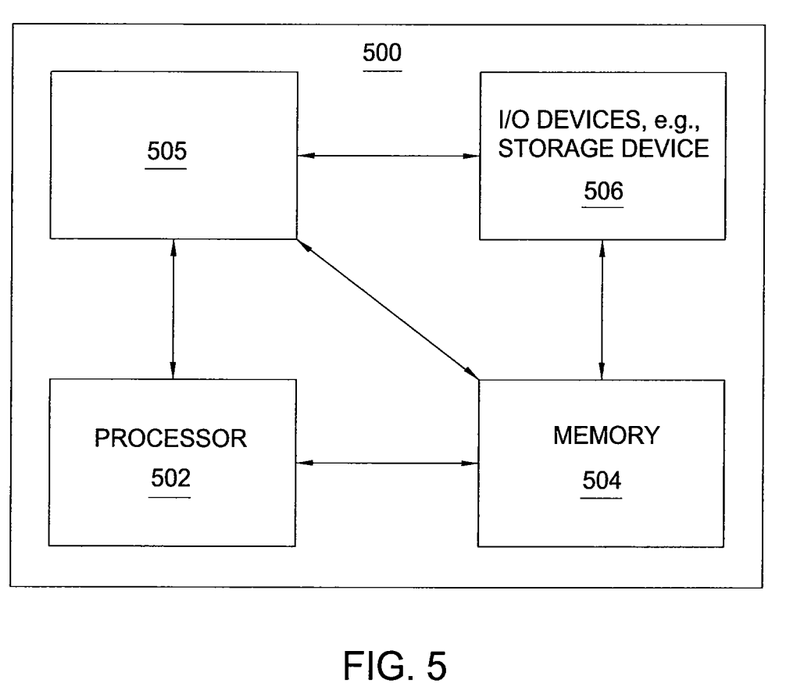
FIG. 5 illustrates a high-level block diagram of a general-purpose computer suitable for use in performing the functions described herein.

FIG. 5 depicts a high-level block diagram of a general-purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for providing collaborative viewing of a media stream, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 505 for providing collaborative viewing of a media stream can be loaded into memory 504 and executed by processor 502 to implement the functions as discussed above. As such, the present method 505 for providing collaborative viewing of a media stream (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a media stream via a network, comprising:

establishing, by a processor, a viewing group having a plurality of members, wherein the viewing group is defined by a member of the plurality of members;

providing, by the processor, the media stream that is accessible by the plurality of members of the viewing group, wherein the media stream comprises a video;

receiving, by the processor, a first annotation from a first member of the plurality of members of the viewing group who has accessed the media stream at a first time period;
saving, by the processor, the first annotation with a temporal marker;
generating, by the processor, an interest profile of the viewing group based upon the first annotation;
providing, by the processor, the first annotation to a second member of the plurality of members of the viewing group who accesses the media stream at a second time period, wherein the second time period is subsequent to the first time period;
receiving, by the processor, a second annotation from the second member of the plurality of members;
saving, by the processor, the second annotation with another temporal marker;
updating, by the processor, the interest profile of the viewing group based upon the second annotation; and
generating, by the processor, an additional media stream based upon the interest profile of the viewing group, wherein the additional media stream comprises a video of a highlighted portion from the media stream, wherein the highlighted portion is selected based upon the first annotation and the second annotation.

2. The method of claim 1, wherein the media stream is stored at a network server of the network and made accessible to the plurality of members of the viewing group.

3. The method of claim 1, wherein the media stream is transmitted to the plurality of members of the viewing group, and wherein the media stream is stored locally in an endpoint device of a member of the plurality of members of the viewing group.

4. The method of claim 1, wherein the first annotation is only transmitted when the second member of the plurality of members of the viewing group requests viewing of the media stream.

5. The method of claim 1, wherein the first annotation comprises a video annotation.

6. The method of claim 1, wherein the first annotation comprises a text annotation.

7. The method of claim 1, wherein the first annotation comprises an audio annotation.

8. A non-transitory computer-readable medium storing instructions which, when executed by a processor, cause the processor to perform operations for providing a media stream via a network, the operations comprising:
establishing a viewing group having a plurality of members, wherein the viewing group is defined by a member of the plurality of members;
providing the media stream that is accessible by the plurality of members of the viewing group, wherein the media stream comprises a video;
receiving a first annotation from a first member of the plurality of members of the viewing group who has accessed the media stream at a first time period;
saving the first annotation with a temporal marker;
generating an interest profile of the viewing group based upon the first annotation;
providing the first annotation to a second member of the plurality of members of the viewing group who accesses the media stream at a second time period, wherein the second time period is subsequent to the first time period;
receiving a second annotation from the second member of the plurality of members;
saving the second annotation with another temporal marker;
updating the interest profile of the viewing group based upon the second annotation; and
generating an additional media stream based upon the interest profile of the viewing group, wherein the additional media stream comprises a video of a highlighted portion from the media stream, wherein the highlighted portion is selected based upon the first annotation and the second annotation.

9. The non-transitory computer-readable medium of claim 8, wherein the media stream is stored at a network server of the network and made accessible to the plurality of members of the viewing group.

10. The non-transitory computer-readable medium of claim 8, wherein the media stream is transmitted to the plurality of members of the viewing group, and wherein the media stream is stored locally in an endpoint device of a member of the plurality of members of the viewing group.

11. The non-transitory computer-readable medium of claim 8, wherein the first annotation is only transmitted when the second member of the plurality of members of the viewing group requests viewing of the media stream.

12. The non-transitory computer-readable medium of claim 8, wherein the first annotation comprises a video annotation.

13. An apparatus for providing a media stream via a network, comprising:
a processor; and
a computer-readable medium storing instructions which, when executed by the processor, cause the processor to perform operations, the operations comprising:
establishing a viewing group having a plurality of members, wherein the viewing group is defined by a member of the plurality of members;
providing the media stream that is accessible by the plurality of members of the viewing group, wherein the media stream comprises a video;
receiving a first annotation from a first member of the plurality of members of the viewing group who has accessed the media stream at a first time period;
saving the first annotation with a temporal marker;
generating an interest profile of the viewing group based upon the first annotation;
providing the first annotation to a second member of the plurality of members of the viewing group who accesses the media stream at a second time period, wherein the second time period is subsequent to the first time period;
receiving a second annotation from the second member of the plurality of members;
saving the second annotation with another temporal marker;
updating the interest profile of the viewing group based upon the second annotation; and
generating an additional media stream based upon the interest profile of the viewing group, wherein the additional media stream comprises a video of a highlighted portion from the media stream, wherein the highlighted portion is selected based upon the first annotation and the second annotation.

* * * * *